Aug. 20, 1935.                G. W. WALTON                2,012,207
                        SYNCHRONOUS ELECTRIC MOTOR
                   Filed Jan. 14, 1932        2 Sheets-Sheet 1
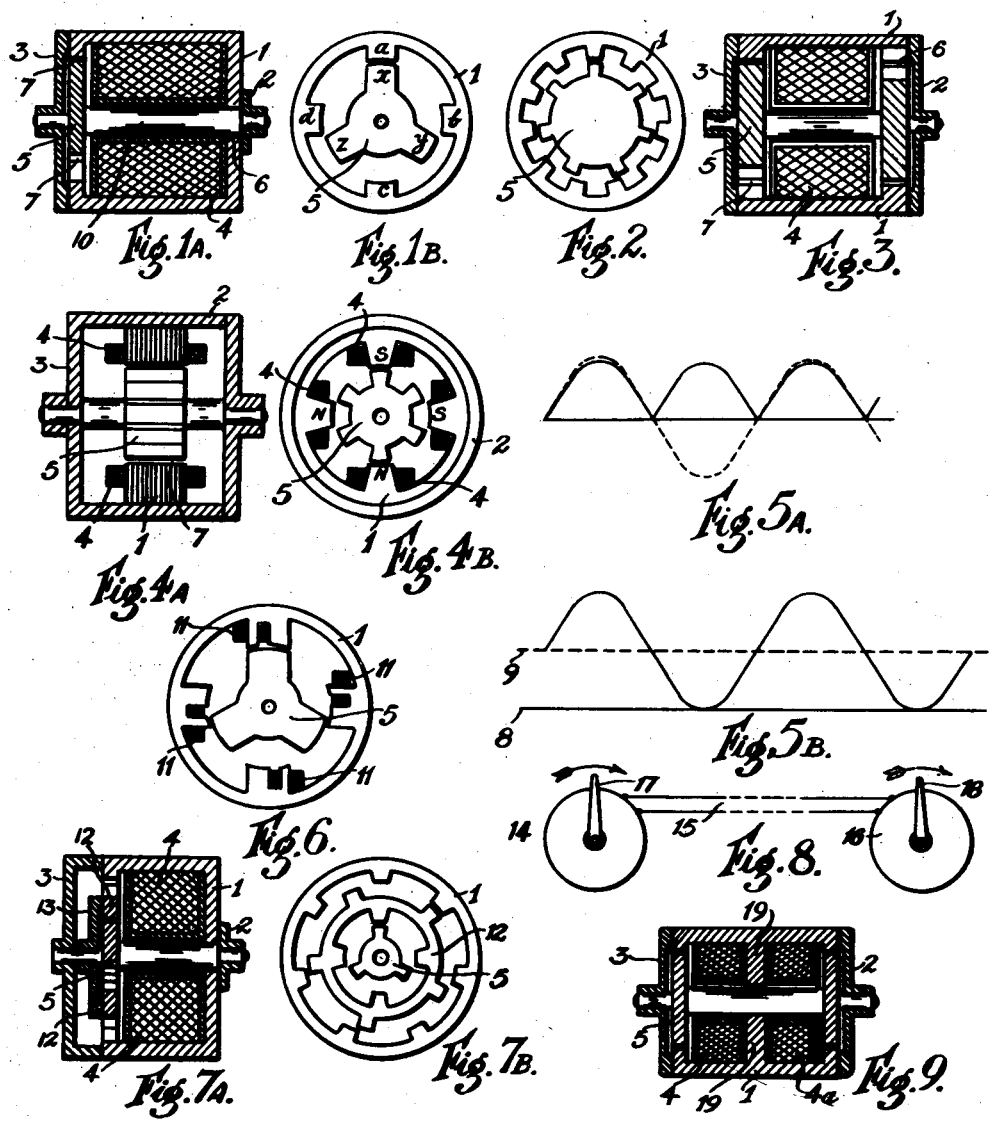

Aug. 20, 1935.  G. W. WALTON  2,012,207
SYNCHRONOUS ELECTRIC MOTOR
Filed Jan. 14, 1932    2 Sheets-Sheet 2
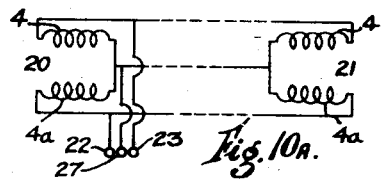
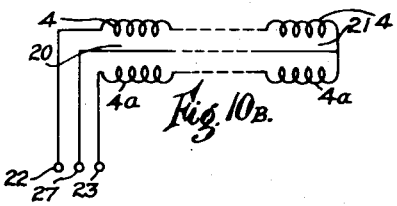
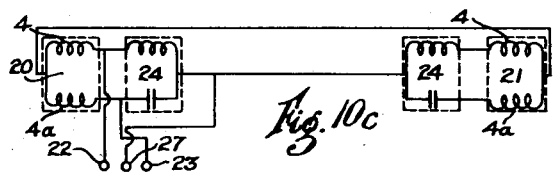
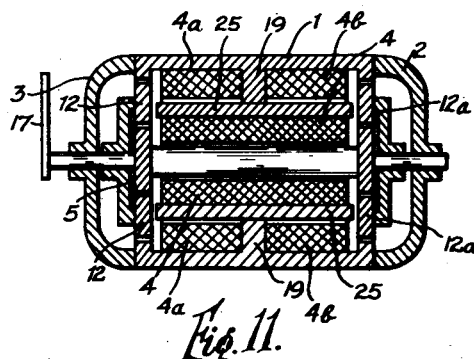
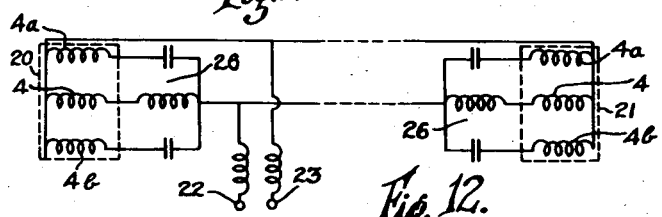
Inventor
George W. Walton Patented Aug. 20, 1935

2,012,207

UNITED STATES PATENT OFFICE 2,012,207

SYNCHRONOUS ELECTRIC MOTOR

George William Walton, London, England

Application January 14, 1932, Serial No. 586,663
In Great Britain January 19, 1931

5 Claims. (Cl. 172—275)

This invention relates to electric motors adapted to run in synchronism with alternating or pulsating electrical currents.

It is an object of the present invention to provide motors which, though synchronous, are adapted to rotate at low speeds without the use of gears and with fewer poles than hitherto.

Hitherto synchronous motors have always had synchronous speeds bearing some simple relation to the frequency of the operating impulses. For instance, a two-pole motor has a minimum synchronous speed of one revolution per cycle of the operating alternating current and lower speeds have been obtained by multiplying the number of pairs of poles to obtain some sub-multiple speed. When very low speeds were required a very large number of poles have had to be used resulting in relatively high cost and in complexity of construction.

There are many fields of application in which low synchronous speeds and unusual synchronous speeds are required such as electrical clocks, television and picture telegraphy apparatus, gramophones and the like, and it is an object of the invention to provide a motor which is particularly adapted for use in such fields.

Other objects and features of the invention will be apparent from the following description and from the appended claims.

The invention will be described with reference to the accompanying drawings, it being understood that these drawings are purely by way of illustration and many other forms and designs are within the ambit of the invention as defined in the appended claims.

Fig. 1A shows a longitudinal section of a simple motor according to the invention, and Fig. 1B an end view of the same with an end plate removed;

Fig. 2 shows an end view of another form of motor according to the invention;

Fig. 3 shows a longitudinal section of a motor having a double rotor;

Fig. 4A shows a longitudinal section of a motor which is not homo-polar and

Fig. 4B an end view of the same with an end plate removed;

Fig. 5A is a curve showing the form of the magnetic impulses when motors according to this invention are operated on alternating current;

Fig. 5B illustrates the use of combined alternating and direct current;

Fig. 6 shows an embodiment of the invention using shaded poles;

Fig. 7A shows a longitudinal section of a further form of the invention and

Fig. 7B an end view of the same with an end plate removed;

Fig. 8 illustrates a method of remote control;

Fig. 9 shows a particular form of device for remote control;

Figs. 10A, B and C show systems of connection for the purpose of remote control;

Fig. 11 shows a particular form of device suitable for remote control purposes, and Fig. 12 shows a method of connection of devices such as are shown in Fig. 11.

Referring to Fig. 1, A and B, a stator 1 of magnetic material, such as iron, has two end plates 2 and 3, carrying bearings in which rotates the rotor 5. A coil 4 surrounds the spindle of the rotor, but does not rotate with it. The stator 1 has four poles $a$, $b$, $c$ and $d$ and the rotor 5 three poles $x$, $y$ and $z$. The motor is of the homo-polar type, and consequently, at any instant, all the poles of the stator have the same polarity and all the poles of the rotor have the opposite polarity. When the rotor is rotating clockwise at its minimum synchronous speed, upon the arrival of one electrical impulse, one pole $x$ of the rotor will be opposite a pole $a$ of the stator. At the next impulse the pole $z$ of the rotor will co-incide with the pole $d$ of the stator. Since the angular separation of the poles of the stator is 90 degrees, and that of the rotor 120 degrees, the angle through which the rotor has moved in the interval between these two impulses is 30 degrees. Consequently twelve impulses will be required for one revolution of the rotor.

In general it will be found that the minimum synchronous speed of a rotor having $P_1$ poles relative to a stator having $P_2$ poles is given by $$S_m = \frac{F}{M} \qquad (1)$$

where $S_m$ is the minimum synchronous speed in revolutions per second, F is the number of impulses per second and M is the least common multiple of the numbers $P_1$ and $P_2$.

There must always be co-incidence between a stator and a rotor pole upon the arrival of every impulse and it will be seen that the speed $S_m$ is the lowest speed at which this condition can be satisfied. There are clearly however other synchronous speeds which are multiples of $S_m$ and therefore the synchronous speed S is represented most generally by $$S = \frac{AF}{M} \qquad (2)$$

where A is any integer depending upon the number of polar co-incidences which are "skipped" between successive impulses. Thus when an impulse arrives for each co-incidence $A=1$; when one co-incidence is skipped $A=2$ and so on.

It should be noticed that where the word co-incidence is used in this specification to describe the relation between stator and rotor poles it is not intended to mean exact co-incidence. When the rotor is running synchronously under load exact co-incidence will always occur slightly after the arrival of an impulse.

The polar arrangement of Fig. 2 is suitable for a gramophone motor operating from 50 cycles alternating current. The normal speed of a gramophone disc is approximately 78 revolutions per minute, and 50 cycle alternating current will give 6000 impulses per minute. The minimum synchronous speed of the rotor will therefore be $$\frac{6000}{7 \times 11} \text{ i. e. } 77\frac{71}{77}$$

revolutions per minute. It will be seen that the device of Fig. 2 will give approximately the required speed for a gramophone without the use of gears. If a normal type of synchronous motor with equal numbers of poles on stator and rotor were used without gearing to obtain such a low speed, it would require approximately 154 poles, whereas the device in Fig. 2 requires only 18 poles.

The arrangement of Fig. 1 is such that the effective poles are at 7, and at 6 there are no poles. An alternative arrangement is shown in Fig. 3, in which there are poles at both ends of the rotor. In this example, each end of the rotor has three poles, but the two ends are displaced 60 degrees relative to each other, the synchronous speed of the motor being exactly the same as in Fig. 1. The second set of stator teeth may be in alignment with the first set or, if desired, they may also be angularly displaced.

Fig. 4A and Fig. 4B show an alternative arrangement which is not homo-polar, but which will have the same synchronous speed as the device of Fig. 1, each of the stator poles having a separate coil, and the connections of these coils being such that opposite poles are of opposite polarity. Consequently, for every impulse, two poles of the stator engage with two poles of the rotor, and the rotor can therefore be considered as being equivalent to the rotor of Fig. 3. At the next impulse, the other two poles of the stator engage with two other poles of the rotor.

In both the arrangements of Figs. 4A and 4B and also in the homo-polar arrangements described it will be evident that all the poles of the stator are simultaneously energized to maximum magnetomotive force.

The devices described operate by magnetic impulses which are generated by the applied electrical impulses. In Fig. 5A the magnitude of these magnetic impulses is shown in full lines plotted to a time base, the alternating current producing these magnetic impulses being represented by the dotted line. From these curves it is clear that the frequency of the magnetic impulses is twice the frequency of the alternating current. It is, however, possible with alternating current to arrange that the frequency of magnetic impulses shall be the same as the frequency of the alternating current, and this may be done by supplying to the coil of the motor of Fig. 1 alternating current and direct current as shown in Fig. 5B, where the distance between the lines 8 and 9 represents the strength of the direct current and the sine wave represents the magnitude, to a time base, of both the electric current and also the magnetic impulses. Under these conditions, therefore, the resultant magnetic impulses are always uni-directional. Any lower value of direct current than that represented by the distance between lines 8 and 9 of Fig. 5B may be used, through if the value is very much lower, the impulses will begin to take the form of Fig. 5A.

It will be seen that in the motors above described, any one pole of either set exerts maximum driving torque in response to one or more of the electrical impulses impressed on the motor during each revolution and a reduced or negligible driving torque in response to the remainder of said impulses when the motor is running at synchronous speed. Thus, for example, in the motor of Fig. 1B, the poles $a$ and $x$ co-operate to exert maximum torque when an impulse arrives with the rotor in the position shown; the poles $d$ and $z$ on the one hand and $b$ and $y$ on the other hand exert reduced torque in opposite directions, and the pole $c$ exerts negligible torque. After the rotor has revolved through 30 degrees a second impulse arrives and there will then be maximum torque between poles $d$ and $z$; reduced torque in opposite directions between poles $a$ and $x$ and $y$ and $c$ and negligible torque at the pole $b$ and so on. Thus in one revolution each stator pole exerts maximum torque, reduced torque and negligible torque three times and the rotor poles pass through the same cycle four times.

Clearly, also, the angle moved through by the rotor between successive impulses at minimum synchronous speed is less than the angular distance between adjacent poles of either set.

When the motor is required to be self-starting, shaded poles or some equivalent arrangement may be used. Fig. 6 shows the device of Fig. 1 provided with shaded poles, a short circuit coil 11 being shown on each pole. It is not necessary that all the poles of the stator should be provided with shaded poles, as in many cases one or two poles only need be so provided to produce the necessary self-starting. In many cases the rotor may have a squirrel-cage winding, as in ordinary alternating current induction motors, for the purpose of self-starting. A further way of providing a self-starting characteristic is to have small inter-poles each having a winding which is connected, in series with a resistance, capacity or inductance, across the alternating current motor terminals, the series impedance being for the purpose of producing a phase displacement of the current in the winding of the inter-pole as is known in alternating current practice.

Simple motors such as those previously described using only two sets of co-operating poles $P_1$ and $P_2$ have, as has already been described, a minimum synchronous speed equal to the frequency of impulses divided by the lowest common multiple M of $P_1$ and $P_2$. It must be understood that these speeds are truly synchronous and are dependent on the frequency of the impulses, but in order that there shall be a synchronous speed it is necessary to arrange that the angle of the pole-arc shall be such that there is a change of total engaged pole area (that is to say in the total area of overlap between stator and rotor poles) as the rotor is moved relative to the stator. Clearly if a change of engaged or overlapping area does not occur the rotor will not experience any driving torque due to the flux changes produced by the applied impulses. A change in overlapping area always occurs provided that one rotor pole has passed from complete engagement with a stator pole to a position of no overlap with that pole before any overlap commences between any other rotor and stator poles. However, it is not necessary, and not always convenient, to arrange for this and many arrangements not exhibiting this feature nevertheless exhibit the requisite change in total overlapping area. It is believed to be a general condition for no change in overlapping area that the angle subtended by the pole arcs at the rotor axis should equal $$\frac{360n°}{M},$$

where $n$ is any integer and $M$ is the L. C. M. of the pole numbers, and accordingly the pole arcs should be given a value other than that which corresponds to an angle of $$\frac{360n°}{M}.$$

Preferably, the angle is made less than $$\frac{180°}{M}$$

or equal to an odd integral multiple of $$\frac{180°}{M}$$

as in this way the maximum change in overlapping area can be obtained. For example, in the case of Fig. 1, the pole arc may be 45 degrees. However, in the case of a motor having a four-pole rotor cooperating with a five-pole stator, the pole-arc must not be 36 degrees, for in that case there will be no change of total engaged pole area and consequently no true synchronous speed; but a synchronous speed could be obtained by using a pole arc of 45 degrees. It willl be apparent that the pole arc of the stator should equal the pole arc of the rotor to obtain precise synchronous effects.

The simple motor of Fig. 1 may be converted into a double-tandem motor as shown in Figs. 7A and B, where the rotor 5 having three poles co-operates with four poles of the intermediate rotor or spinner 12; and the spinner having a second set of five poles engaging with seven poles of the stator 1.

The operation of this motor will be clear from the following considerations:—

From Formula (2) above we see that the synchronous speeds of the spinner 12 relative to the stator 1 may be represented by $$S = \frac{AF}{M}$$

Similarly the synchronous speeds of the rotor 5 relative to the spinner 12 may be represented by $$S_1 = \frac{A_1 F}{M_1}$$

where $S_1$, $A_1$ and $M_1$ have the same significance for the rotor-spinner combination as have $S$, $A$ and $M$ for the spinner-stator combination.

All the synchronous speeds of the rotor 5 relative to the stator 1 are therefore given by $$S_2 = F\left(\frac{A}{M} \pm \frac{A_1}{M_1}\right) = F\left(\frac{AM_1 \pm A_1 M}{MM_1}\right)$$

Now the minimum synchronous speed of the rotor will be the value of $S_2$ when $AM_1 - A_1 M$ is equal to ±1. There will always be some values of the integers $A$ and $A_1$ which will give a difference of unity between $AM_1$ and $A_1M$ provided that $M$ and $M_1$ have no common factor. Where they have a common factor $f$ then the minimum synchronous speed will be $$\frac{fF}{MM_1}$$

In practice it will usually be found convenient to run the rotor at its minmum synchronous speed relative to the spinner and therefore $A_1$ will usually be unity.

Returning to the example of Figs. 7A and 7B we have $M=5\times7$ and $M_1=3\times4$ and we therefore have a minimum synchronous speed of the rotor relative to the stator of $$\frac{F}{420}.$$

Where $A_1=1$ the value of $A$ is the ratio of $M$ and $M_1$ to the nearest integer and in this case it will be seen that $A=3$ and therefore for every impulse there is one co-incidence of the rotor and spinner poles and there are three co-incidences of the spinner and stator poles. If the motor be so designed, by the provision of shaded poles or the like, so that the spinner rotates in a clockwise direction relative to the stator and the rotor in an anti-clockwise direction relative to the spinner, then the speed of the former will be $$\frac{3F}{35}$$

and that of the latter $$\frac{F}{12}$$

In this case therefore the rotor will rotate at a speed of $$\frac{F}{420}$$

in a clockwise direction relative to the stator.

It is necessary to arrange that the spinner should have such an inertia as to have a kinetic energy when rotating at its correct speed which is comparable with the power of the motor. It is also necessary that the inertia of the rotor 5 and its load shall be such that their combined kinetic energy also is comparable to the power of the motor.

If the rotor has a sufficiently small inertia and if other conditions are such that, on starting up, the rotor tends to rotate in the same direction relative to the spinner as the spinner in relation to the stator, then the minimum synchronous speed of the rotor relative to the stator will be $$\frac{F}{7\times5} + \frac{F}{4\times3} = F\left(\frac{12+35}{12\times35}\right) = \frac{47F}{420}$$

If the numbers of the poles of the device of Fig. 7 be kept the same and if their arrangement be changed other speeds will be produced. For instance, if a seven-pole stator co-operates with four poles on the spinner and five poles on the spinner co-operate with three poles on the rotor, entirely different speeds may be obtained when the spinner, because of the self-starting arrangement, tends to rotate clockwise, and the rotor, because of its self-starting arrangement, tends to rotate anti-clockwise, for then the spinner attains a speed equal to $$\frac{F}{7\times4}$$

and the rotor a speed equal to $$F\left(\frac{15A-28}{420}\right)$$

In this case A would be two and therefore the rotor would rotate in a clockwise direction relative to the stator at a speed of $$\frac{F}{210}$$

A further re-arrangement of the device of Fig. 7 is a stator of five poles co-operating with four poles of the spinner and seven poles of the spinner co-operating with three poles of the rotor, in which case when the spinner tends to rotate clockwise and the rotor anti-clockwise because of their starting arrangements, such as shaded poles, the speed of the spinner is $$\frac{F}{5 \times 4}$$

and the final speed of the rotor is $$F\left(\frac{21A - 20}{420}\right)$$

in which case $A=1$, and the rotor speed relative to the stator is equal to $$\frac{F}{420}$$

in a clockwise direction.

Many other arrangements of motors using spinners and other numbers of poles than those given may be used to obtain, by suitable design, a great variety of different speeds. Clearly, in order to obtain the lowest possible synchronous speeds with a relatively small number of poles, it is always necessary to arrange that the direction of rotation of the rotor relative to the spinner is opposite to the direction of the spinner relative to the stator.

It will be appreciated that the devices of this invention may also be used as generators of impulses or alternating current. Accordingly the specification and claims are intended to be read to include a generator even though in many cases only a motor is referred to. For instance, if the coil of the motor of Fig. 1 is energized with direct current and the rotor driven mechanically, there will appear in the coil an alternating current which can be separated from the direct current in any known or suitable manner. Alternatively, the coil 4 may consist of two portions, one carrying direct current and the other having the alternating current generated in it. A further method is to make the spindle 10 of the rotor, or some other portion of the magnetic circuit, a permanent magnet, in which case alternating current will be generated in the coil 4.

A permanent magnet may also be used in a motor driven by alternating current, instead of the direct current, to obtain the effect shown in Fig. 5B. The devices of the invention using spinners may also be used as generators of alternating current by driving only the rotor, and by suitably arranging the self-starting means of the spinner so that the spinner tends to rotate in one direction relative to the rotor and in the same direction or in the opposite direction relative to the stator, the relative speeds being such that the desired frequency is produced.

Generators of this type are of great utility. For instance, hitherto, if the prime mover was of low speed, it was necessary to use a generator having a large number of poles or to gear it up in order to obtain a desired frequency. By the use of this invention, however, a prime mover having a speed of 200 revolutions per minute, driving a generator required to produce 50 cycle alternating current, need only have a rotor of five poles engaging with a stator of six poles, whereas otherwise thirty poles would have been required. For the purpose of producing high frequency alternating current such as is required for experimental, test and wireless purposes, generators according to this invention are particularly applicable.

Devices according to this invention may use more than one spinner in tandem, thereby affording peculiar synchronous speeds.

A combination of a generator connected to a motor according to this invention constitutes a useful system of remote control or remote indication. For instance, if two motors according to Fig. 1 are connected together, as shown in Fig. 8, when the rotor of one motor 14 is rotated by means of the lever 17, the lever 18 connected to the rotor of the second motor 16 will move in step with the lever 17. It is, however, necessary in this case that all movements of the lever 17 shall be in the same direction, and it is only possible to obtain a movement of the lever 18 corresponding to the angle of movement produced by one impulse, or any multiple thereof.

This arrangement has the further disadvantage that no movement of the lever 18 will occur if the lever 17 is moved at less than a certain speed, since the electromotive force generated by the generator 14 is dependent upon the speed of movement of its rotor.

A different form of device is shown in Fig. 9 which is in effect a double motor, having a separator 19 between the two halves of the motor, so that each half of the motor is complete in itself, the first half having a coil 4, and the second half a coil 4a. If such a motor is connected to a similar motor as shown in Fig. 10A, where 20 is the first motor, and 21 the second one, and an alternating current is applied to the two terminals 22 and 23, and if the self starting arrangement of the rotors of the motors is such that each half tends to rotate in the opposite direction, then there will be no movement of the rotors. Should one rotor be moved, then a different frequency will be generated in coil 4 relative to coil 4a, which acting on similar coils of the distant motor 21 will cause the rotor of 21 to move. The action is due to the fact that in one coil an increased frequency is generated, and in the other a reduced frequency.

Instead of one frequency of alternating current being applied to the terminals 22 and 23, two different frequencies may be applied, one across terminals 22 and 27 and the other across terminals 23 and 27, and the two halves of the motor of Fig. 9 are then arranged with such numbers of poles that each half tends to rotate in the opposite direction with the same speed. In this case also, any movement of the rotor of 20 will produce a similar movement of the rotor of 21.

Fig. 10B shows alternative connections for the motors 20 and 21 which may be used instead of those in Fig. 10A.

Fig. 10C shows another circuit arrangement using two different energizing frequencies with only two wire connections between the motors 20 and 21. Connected to the coils of the motors 20 and 21 are devices 24 each consisting of two branched circuits, the branches which are connected to coils 4 each containing an inductance and the other branches which are connected to coils 4a each containing a condenser. The two energizing frequencies are applied as before to the terminals 22, 27, 23. By selecting suitable values for the inductance and capacity in the devices 24, there will be a predominance of one of the two energizing frequencies in the circuit of 4, and a predominance of the other energizing frequency in the circuit of 4a. When the rotor of 20 is moved, there are produced, as previously described, different frequencies, which, acting on the motor 21, will produce a corresponding movement of its rotor.

In these devices the movement of the rotor can only take place by pole engagements as before. For instance, if the rotor had three poles and the stator four poles, then movement of the distant rotor could only take place in multiples of thirty degrees. By using a larger number of poles it is of course possible to get smaller amounts of movement, for instance with nine and eleven poles, movements of 1/99 of one revolution, or any multiple of this may be obtained.

In the remote control and indicating devices already described there is no movement until one or the other rotor is disturbed. Generally, however, much better remote control or indicating can be obtained if there are used devices of the kind shown in Fig. 11 in which there is constant synchronous motion. In Fig. 11 there is an energizing coil 4, and alternating current passed through this coil energizes both halves of a double motor causing the spinners 12 and 12a to rotate in opposite directions at the same speed, that is to say, the inner poles of the two spinners, which engage with the poles of the rotor 5 are equal in number, as are also the poles at the two ends of the rotor 5. Two further coils 4a and 4b are provided, one in each half of the motor and these coils are separated by a separator 19. A separator 25 of magnetic material is also placed between the coil 4 and coils 4a and 4b, so that each of the coils shall have an independent magnetic circuit. When the two spinners are rotating as described, there is no tendency for the rotor 5 to rotate. The outer poles of the spinners 12 and 12a engaging with the stator 1 may also be equal, as may also be the poles at the two ends of 1, in which case equal frequencies will be generated in the coils 4a and 4b, which may be connected to the corresponding coils in a similar motor arranged at a distance. When the rotor 5 is moved by means of the arm 17, one of the spinners is advanced and the other retarded with the result that the frequencies generated in the two coils 4a and 4b become different, and, acting on the similar coils in the distant motor, produce the same amount of movement of its rotor. By arranging that the number of outer poles of the spinner 12 are different from the number of outer poles of the spinner 12a, the frequencies generated in coils 4a and 4b will be different when the rotor 5 is at rest and when the rotor 5 is moved these frequencies will change. In this last case the two devices may be connected by two wires as shown in Fig. 12, in which 20 and 21 are the two motors, the windings of each being connected to a device 26 consisting of parallel circuits. The alternating current for energizing the system is applied to the terminals 22 and 23. Each of the parallel circuits contains such values of inductance or capacity, or both, that there is a predominance of one of the three frequencies existing in the circuits in one of the coils of each motor. That is to say, one frequency predominates in the coil 4 of each of the devices 20 and 21, one of the other frequencies predominates in the coils 4a and the third frequency predominates in the coils 4b. As before, when the rotor of motor 20 is moved, the frequencies in coils 4a and 4b change, and these frequencies, acting on the corresponding coils in the distant motor 21, produce a movement of its rotor. In this case, however, the movement of the rotor of motor 21 may be of any amount, no matter how small, for account is taken of difference of phase.

These remote control and indicating arrangements, particularly those using the device of Fig. 11, are of very great practical utility, for the motors are in themselves cheap and simple and are not likely to get out of order, and as they require little attention they may be placed in inaccessible positions.

The remote control arrangements may be used for steering controls of ships, wireless control of ships and areoplanes, remote control of machines and apparatus and the like. Similarly the same devices may be used for remote indicating such as remote indications at a power station of a meter at an electrical sub-station; gyroscopic compass repeaters and such similar applications. The invention may be applied in many cases where peculiar or very low synchronous speeds are required, and as an electrical generator where high frequencies of electrical currents are required to be generated by low speed prime movers.

I claim:
1. An electric motor adapted to run in synchronism with electrical impulses and comprising a set of stator poles, a set of rotor poles mounted for rotation about an axis relatively to the stator poles, the poles of both said sets being uniformly spaced around said axis, means for simultaneously energizing all the poles of one of said sets to maximum magnetomotive force in response to said electrical impulses, and faces upon the stator poles adapted to co-operate magnetically with faces upon the rotor poles, said faces subtending at said axis angles which are substantially equal to one another and such that the total overlapping area between the faces of the stator and rotor poles changes during relative rotation of stator and rotor, and the numbers of poles in the two sets being unequal and in other than integral multiple relationship.

2. An electric motor adapted to run in synchronism with electrical impulses and comprising a set of stator poles, a set of rotor poles mounted for rotation relatively to said stator poles, a spinner member mounted for rotation mechanically independently of and relatively to said stator and rotor poles, two sets of poles upon said spinner member, one of these sets being adapted to cooperate magnetically with said stator poles and the other being adapted to cooperate magnetically with said rotor poles, the number of poles in all of said sets being different from one another and containing no common factor.

3. An electric motor adapted to run in synchronism with electrical impulses and comprsing a set of stator poles, a set of rotor poles mounted for rotation relatively to said stator poles and a spinner member mounted for rotation mechanically independently of and relatively to said stator and rotor poles, said spinner member comprising an annular yoke portion of magnetic material, a plurality of poles adapted to cooperate with said stator poles and a plurality of poles adapted to cooperate wtih said rotor poles, said yoke portion constituting a path for the magnetic flux between the first and second mentioned poles of said spinner member.

4. An electric motor adapted to run in synchronism with electrical impulses and comprising a set of stator poles, a set of rotor poles mounted for rotation relatively to said stator poles, a spinner member mounted for rotation mechanically independently of and relatively to said stator and rotor poles, and, upon said spinner member a set of poles adapted to cooperate magnetically with said stator poles and a second set of poles adapted to cooperate magnetically with said rotor poles, the numbers of poles in all of said sets being different from one another and in other than integral multiple relationship.

5. An electric motor adapted to run in synchronism with electrical impulses and comprising a set of stator poles, a set of rotor poles mounted for rotation relatively to said stator poles, a spinner member mounted for rotation mechanically independently of and relatively to said stator and rotor poles, two sets of poles upon said spinner member, one of these sets being adapted to cooperate magnetically with said stator poles and the other being adapted to cooperate magnetically with said rotor poles, the number of poles in all of said sets being different from one another and in other than integral multiple relationship, a working air gap between each of said cooperating sets of poles, a single magnetic circuit including said working air gaps in series and a coil surrounding said magnetic circuit.

GEORGE WILLIAM WALTON.